US008646696B2

(12) United States Patent
Slikkerveer et al.

(10) Patent No.: US 8,646,696 B2
(45) Date of Patent: *Feb. 11, 2014

(54) CHIP CARD COMPRISING A DISPLAY

(75) Inventors: Peter Slikkerveer, Waalre (NL); Pawel Musial, Gdynia (PL)

(73) Assignee: NPX B.V., Eindhoven (NL)

( * ) Notice: Subject to any disclaimer, the term of this patent is extended or adjusted under 35 U.S.C. 154(b) by 256 days.

This patent is subject to a terminal disclaimer.

(21) Appl. No.: 12/742,166

(22) PCT Filed: Nov. 10, 2008

(86) PCT No.: PCT/IB2008/054695
§ 371 (c)(1),
(2), (4) Date: May 10, 2010

(87) PCT Pub. No.: WO2009/063386
PCT Pub. Date: May 22, 2009

(65) Prior Publication Data
US 2011/0101108 A1    May 5, 2011

(30) Foreign Application Priority Data

Nov. 12, 2007  (EP) .................... 07120455

(51) Int. Cl.
*G06K 7/08*    (2006.01)
*G06K 19/06*   (2006.01)

(52) U.S. Cl.
USPC .......................................... 235/492; 235/451

(58) Field of Classification Search
USPC ................ 235/375, 380, 451, 492, 487
See application file for complete search history.

(56) References Cited

U.S. PATENT DOCUMENTS

| 4,843,224 | A | * | 6/1989 | Ohta et al. | 235/487 |
|---|---|---|---|---|---|
| 5,910,652 | A | * | 6/1999 | Kuriyama | 235/492 |
| 5,950,013 | A | * | 9/1999 | Yoshimura et al. | 710/5 |
| 7,156,313 | B2 | | 1/2007 | Ou et al. | |
| 2003/0019942 | A1 | * | 1/2003 | Blossom | 235/492 |
| 2005/0240778 | A1 | * | 10/2005 | Saito | 713/186 |
| 2005/0247777 | A1 | * | 11/2005 | Pitroda | 235/380 |
| 2005/0263596 | A1 | * | 12/2005 | Nelson et al. | 235/441 |
| 2006/0049263 | A1 | * | 3/2006 | Ou et al. | 235/492 |
| 2006/0124755 | A1 | * | 6/2006 | Ito | 235/492 |
| 2006/0190737 | A1 | | 8/2006 | Miyasaka | |
| 2008/0314971 | A1 | * | 12/2008 | Faith et al. | 235/379 |
| 2010/0276496 | A1 | * | 11/2010 | Slikkerveer et al. | 235/492 |

FOREIGN PATENT DOCUMENTS

| CN | 1462412 | A | 12/2003 |
|---|---|---|---|
| DE | 19910768 | A1 | 9/2000 |
| EP | 0316157 | A2 | 5/1989 |
| EP | 1280099 | B1 | 1/2003 |
| FR | 2893435 | A1 | 5/2007 |
| WO | 94/20929 | A1 | 9/1994 |

* cited by examiner

Primary Examiner — Tuyen K Vo

(57) ABSTRACT

A chip card (1) comprises a chip card controller (3), a display (6), a display driver (5) operatively coupled to the chip card controller (3) and to the display (6), a user input device (12), and a user input interface (13) operatively coupled to the user input device (12). The user input device (12) is configured to turn on and/or turn off at least parts of the chip card (1) and is an integral part of the display driver (5).

19 Claims, 3 Drawing Sheets

CHIP CARD COMPRISING A DISPLAY

FIELD OF THE INVENTION

The invention relates to a chip card comprising a display.

BACKGROUND OF THE INVENTION

In this context, a chip card is any pocket-sized card with an embedded integrated circuit that comprises hardware logic, a memory or a microcontroller/microprocessor which can process information. Chip cards can be categorized in accordance with different criteria. Particularly, chip cards can be categorized as memory-chip cards that comprise a relatively simple logic and as processor-chip cards that comprise, for instance, an operation system. Particularly processor-chip cards can receive an input signal which is processed, by way of an integrated circuit application, and deliver an output signal. Generally, chip cards can be contactless or contact chip cards, or can be a combination of both.

Contact chip cards may include a contact module on their fronts. This contact module may be gold plated and has a size of approximately 1 cm by 1 cm and may contain a chip at the back. The contact chip card may communicate with a reader. When inserted into the reader, electrical connectors of the reader contact the contact module for reading information from and writing information back to the chip card. Since normally the chip card does not include a battery, energy is supplied to the contact chip card by the reader. Contact chip cards are, for instance, standardized by ISO/IEC 7816 or ISO/IEC 7810.

In a contactless chip card, the integrated circuit communicates with the reader in a contactless manner, for instance through Radio-frequency identification (RFID). Contactless chip cards are, for instance, standardized by ISO/IEC 14443 or ISO 15693. Contactless chip cards are also known as transponders which may or may not include an active energy source, such as a battery. Transponders not having a battery are also known as passive transponders and transponders comprising a battery are known as active transponders.

International application for patent No. 94/20929 discloses a chip card that comprises an electronic data memory, an interface means connected to the data memory, to allow access to a reader, and a data display operable to display information indicative of the contents of the data memory.

Chip cards may be used, inter alia, as banking cards, transportation ticketing, loyalty cards, or e-passports. Because of this, a relatively high security level against fraudulent tampering of the card must be assured. Even though the data display may be meant to decrease danger of fraud and tempering of the usage of the chip card, the data display as an additional component potentially allows additional methods for fraud and tempering. Additionally, the display potentially increases power consumption.

OBJECT AND SUMMARY OF THE INVENTION

It is an object of the present invention to provide a chip card comprising a display, which potentially uses less electric energy and whose security level against fraudulent misuse is increased.

The object is achieved in accordance with the invention by means of a chip card comprising a chip card controller, a display, a display driver operatively coupled to the chip card controller and to the display, a user input device, and a user input interface operatively coupled to the user input device, wherein the user input device is configured to turn on and/or turn off at least parts of the chip card and is an integral part of the display driver.

The inventive chip card comprises the display that may, for instance, be an electrophoretic display, an electrochrome display, or a Liquid crystal based display. In order to drive the display, the chip card needs the display driver. A display driver may be a demultiplexer at the direct contact of the display. A display driver may also or alternatively determine which voltage should be where on the display. This functionality may also be referred to as display controller. Furthermore, the inventive chip card comprises the user input device which is meant to turn on and/or turn off at least parts of the chip card such that, for instance, display information, which may be stored in a memory of the chip card, can be displayed on the display. In order to be functional, the user input device, which may be a button, particularly a push button, must be operatively coupled to the user input interface.

According to the invention, this interface is integrated into the display driver. This may be achieved by forming the display driver as a single integrated circuit which includes the user input interface. A push button provides temporary action while being pushed, and not a continuous turn on action.

The inventive chip card may also be configured to verify that the user input device has been activated while the chip card is already running This may be achieved by a register of the chip card registering the activation of the user input device.

The inventive chip card may also include further components, such as a finger print sensor. The inventive chip card may also include an One Time Password (OTP) system which prevents so-called "card swiping", wherein information stored on a chip card memory is copied and the copied information is used for fraudulent misuse.

In one embodiment of the inventive chip card, the button interface, generally the user input interface is configured to generate a signal to wake up at least parts of the chip card in response to activating the button, in general the user input device, wherein the chip card is shut off before activating the push button. The button action, in general the user input device action itself might carry the power needed to power a wake-up system of the chip card for waking up at least parts of the chip card. This may be achieved if, for instance, the button is a push button providing a signal of sufficient energy to the button interface when activated or when the button comprises a piezo device providing an energy pulse to the button interface.

In one embodiment of the inventive chip card, this integrated circuit includes the user input interface, but not the chip card controller. This embodiment results in a relatively high level of integration of the inventive chip card, potentially decreasing production cost. On the other hand, the separation of the chip card controller and the display driver potentially increases the level of security for the controller. A full integration of most or all components, especially an integration of the chip card controller and the display driver including the user input interface into a single integrated circuit results in an increased number of outputs, potentially alleviating eavesdropping of the entire chip card.

In one embodiment, the inventive chip card further comprises access to at least one electric power source operatively coupled to the display driver, wherein the display driver further comprises, as an integral part, a power management functionality configured to manage electric power that is available from the at least one power source for at least the display driver. In this embodiment, the inventive chip card includes power management capability particularly intended to reduce power consumption of the chip card. As to the user input interface, the power management functionality is also an integral part of the display driver. This may particularly be achieved by integrating the power management functionality into the single integrated circuit that may form the display driver.

The power management functionality is configured to manage at least the electric power for the display driver, i.e. the display driver is configured to perform its own power management. In one embodiment of the inventive chip card, the power management functionality is also responsible to carry out the power management for the chip card controller. This potentially reduces further electric power consumption of the inventive chip card.

The power management functionality may particularly be configured to turn off power for the chip card controller while the display driver writes information to the display and/or the display displays display information. Then, the chip card controller, which may be, for instance, a microprocessor or a microcontroller, is only powered when absolutely necessary.

The inventive chip card may particularly be configured to communicate with an external reader utilizing its chip card controller. Then, the inventive chip card comprises at least one appropriate communication interface. The inventive chip card may communicate with the reader contactlessly or in a contactbound manner, and thus may include a contactless communication interface or a contact interface. The contact communication interface may be in accordance with ISO 7816 and the contactless communication interface may comprise an antenna and may be in accordance with ISO 14443. It is also possible that the inventive chip card comprises both, a contact communication interface and a contactless communication interface.

When communicating with the reader, the inventive chip card may be powered via the appropriate communication interface. Thus, the access to the power source of the inventive chip card may be formed by a communication interface. The power source, however, may also be a battery which may be non-chargeable or be chargeable utilizing, for instance, power from the communication interface, a capacitor, or a solar cell.

If the inventive chip card comprises access to at least two different power sources, then the power management functionality may be configured to select one of the power sources in accordance with availability of the power sources and/or in accordance with pre-defined criteria. For instance, the power management functionality may be configured to select, if the chip card is activated, only the battery as the power source for the chip card if no power is available via the communication interface. It is also possible to switch from the battery as the power source for the chip card to the communication interface as access to the power source for the chip card if power becomes available via the communication interface. This enhances the lifetime of the battery.

If the inventive chip card comprises the contact communication interface, then the power management functionality of the display driver may be configured to select the contact communication interface as the preferred power source for the chip card. When including the contact communication interface, then power is delivered to the chip card from the reader in a contactbound manner. This results in a relatively strong power source potentially enhancing reliable power delivery to the inventive chip card.

The power management functionality is integrated into the display driver which may be formed as a single integrated circuit. In one embodiment of the inventive chip card, this integrated circuit includes the user input interface and, if equipped with the power management functionality, also the power management functionality, but not the chip card controller. This embodiment results in a relatively high level of integration of the inventive chip card, potentially decreasing production cost. On the other hand, the separation of the chip card controller and the display driver potentially increases the level of security. A full integration of most or all components, especially an integration of the chip card controller and the display driver including the user input interface into a single integrated circuit results in an increased number of outputs, potentially alleviating eavesdropping of the entire chip card. Additionally, since according to this embodiment, the chip card controller and the display driver are not integrated into a single integrated circuit, the power management functionality, if included into the inventive chip card, can relatively easily shut off the chip card controller while still activating the display driver. This results in a further improved power management, because updating the display by the display driver may take a relatively long time and support by the chip controller is not needed during this time.

By activating the user input device, the user of the inventive chip card can turn on and off the chip card. This may allow the user to bring the chip card into a standby mode in which the chip card controller is shut off, reducing power consumption of the chip card. When needed, the chip card controller is reactivated to prolong the lifetime of the power source, particularly the battery.

The user input interface may be configured to generate a signal to wake up the power management functionality in response to activating the user input device, wherein the chip card is shut off before activating the user input device. The user input interface and the power management functionality may be formed on the same semi-conductor, such as silicon, the power management functionality may be configured to turn off the entire chip card, and the user input device may be configured to generate a signal, particularly a signal of sufficient energy, to wake up the power management functionality via the user input interface. This embodiment of the inventive chip card provides for further power savings. Since for this embodiment of the inventive chip card the power management functionality and the user input interface are on the same semi-conductor, such as silicon, a relatively low power standby function can be realized, wherein the power management functionality switches the entire chip card off, may be except of a wakeup function at the user input interface.

If the user input device is a button, particularly a push button, the user input interface is a button interface, then the button may be configured to provide, when activated, the signal sufficient to wake up the power management functionality via the button interface. This may be achieved if, for instance, the button is a push button providing a signal of sufficient energy to the button interface when activated or when the button comprises a piezo device providing an energy pulse to the button interface.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
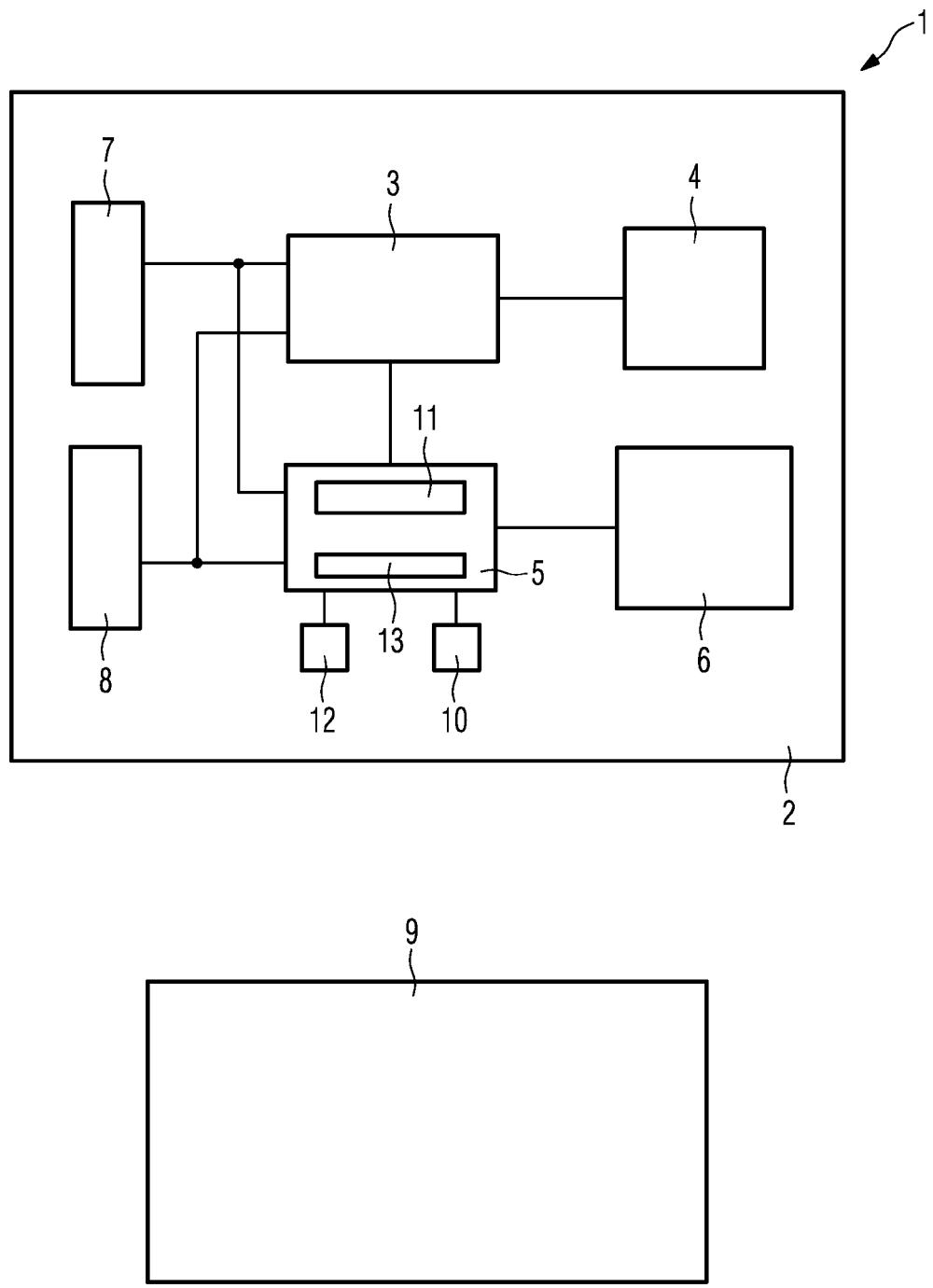
FIG. 1 is a chip card comprising a display.

FIG. 1 shows a chip card 1 comprising a substrate 2, a microcontroller 3, a memory 4, a display driver 5, and a display 6 operatively coupled to the display driver 5. The display driver 5 and the memory 4 are operatively coupled to the microcontroller 3, and the microcontroller 3, the memory 4, the display driver 5, and the display 6 are embedded in the substrate 2. The memory 4 may be an EEPROM, the substrate 2 may be made from plastics, and the display 6 may be an electrophoretic display.

For the exemplary embodiment, the chip card 1 comprises a contact communication interface 7 and a contactless communication interface 8, each operatively coupled to the microcontroller 3 and to the display driver 5. The communication interfaces 7, 8 are embedded in the substrate 2. The contact communication interface 7 may be, for instance, in accordance with ISO 7816 and the contactless communication interface 8, which may comprise an antenna, may be, for instance, in accordance with ISO 14443. Utilizing its communication interfaces 7, 8, the chip card 1 can communicate with a reader 9 that comprises an appropriate communication interface not explicitly shown in the figures.

If the reader 9 comprises a contact communication interface, then the chip card 1 may be inserted into the reader 9 such that the contact communication interface of the reader 9 contacts the contact communication interface 7 of the chip card 1 in a manner per se known in the art. Then, communication between the reader 9 and the chip card 1 can be carried out via the contact communication interface 7. Furthermore, electric energy for the chip card 1 can also be supplied via the contact communication interface 7.

If the reader 9 comprises a contactless communication interface, then the reader 9 can communicate contactlessly with the chip card 1 utilizing the contactless communication interface 8. Communication may then be carried out utilizing Radio Frequency Identification (RFID) per se known in the art. The chip card 1 may then be powered utilizing the field emitted by the reader 9.

For the exemplary embodiment, the chip card 1 further comprises a battery 10 embedded in the substrate 2. The battery 10 is an example of an active power source and may be a chargeable or a non-chargeable battery. Therefore, the chip card 1 may be powered by the battery 10 or via the communication interfaces 7, 8.

For the exemplary embodiment, the display driver 5 is formed by a single integrated circuit that does not include the microcontroller 3, the memory 4, and the communication interfaces 7, 8. Furthermore, the chip card 1 comprises power management functionality integrated into the integrated circuit forming the display driver 5. The power management functionality is indicated by a power management unit 11 in FIG. 1. Besides the communication interfaces 7, 8, the battery 10 is operatively coupled to the display driver 5 such that its power management unit 11 can perform power management of the chip card 1 as will be explained below.

The display 6 is intended to display information stored, for instance, in the memory 4. The microcontroller 3 controls the display driver 5 such that it drives appropriately the display 6.

For the exemplary embodiment, the chip card 1 further comprises at least one button 12 embedded in the substrate 2. The button 12 is an example of a user input device which can be used, when activated by a user of the chip card 1, to turn on the display 6 to show, for instance, the content of the memory 4 or a result of a computation using the content of memory 4. In order to be functional, the button 12 is operatively connected to a button interface 13. The button interface 13 is an example of a user input interface for the user input device and is an integral part of the display driver 5 by being integrated into the single integrated circuit forming the display driver 5.

For the exemplary embodiment, the power management unit 11 and the button interface 13 are formed on the same silicon.

For the exemplary embodiment, when the user activates the button 12, then the button interface 13 generates a signal which wakes up the power management unit 11. The power management unit 11 wakes up the display driver 5 which then activates the microcontroller 3 which in turn retrieves information stored in the memory 4 to be displayed by the display 6. This may be achieved if, for instance, the push button 12 provides a signal of sufficient energy to the button interface 13 when activated or when the button 12 comprises a piezo device providing an energy pulse to the button interface 13.

For the exemplary embodiment, the chip card 1, i.e. its components can be powered by three different power sources, namely the battery 10, or via the communication interfaces 7, 8 when communicating with the reader 9. The purpose of the power management unit 11 is, inter alia, to choose the appropriate power source.

If the reader 9 is a contact reader, then the chip card 1 may be inserted into the reader 9 such that the contact communication interfaces 7 of the reader 9 and the chip card 1 make contact. Then, not only communication between the reader 9 and the chip card 1 is carried out via the contact communication interface 7, but also electric power is delivered via the contact communication interface 7 to the chip card 1. If operated in this mode, the system, i.e. the display driver 5 including its power management unit 11 and the microcontroller 3 wake up upon receiving detecting an electric supply voltage at the contact communication interface 7. For the exemplary embodiment, the electric power is fed directly from the contact communication interface 7 to the microcontroller 3 and to the display driver 5.

If the reader 9 is a contactless reader, then the chip card 1 communicates with the reader 9 via its contactless communication interface 8 when the chip card 1 is in the vicinity of the reader 9. The reader 9 emits a field which powers the chip card 1. For the exemplary embodiment, the electric power is fed directly from the contactless interface 8 to the microcontroller 3 and to the display driver 5 including its power management unit 11.

If the chip card 1 is not in contact with the reader 9, then the display 6 can be turned on by activating one of the buttons 12 and the chip card 1 can be powered by the battery 10. For the exemplary embodiment, the button interface 13 activates the power management unit 11 to wake up the display driver 5 in response to an activated button 12.

Then, the display driver 5 wakes up the microcontroller 3 by powering it utilizing the battery 10 and utilizing its power management functionality. If the voltage level of the battery 10 is too high for the microcontroller 3, then the display driver 5 may include a voltage converter configured to down convert the battery voltage to a level suitable for the microcontroller 3 and also to reduce power usage at the microcontroller 3. The voltage converter may be integrated into the single integrated circuit that forms the display driver 5.

Upon receiving electric power, the microcontroller 3 retrieves display information stored in the memory 4 and sends the retrieved display information to the display driver 5. The display driver 5 then writes the display information to the display 6 for displaying. Furthermore, after having sent the display information to the display driver 5, the microcontroller 3 sends a signal to the display driver 5 to turn off the power supply for the microcontroller 3. After having written the display information to the display 6, the display driver 5 shuts off automatically.

Figure 2:
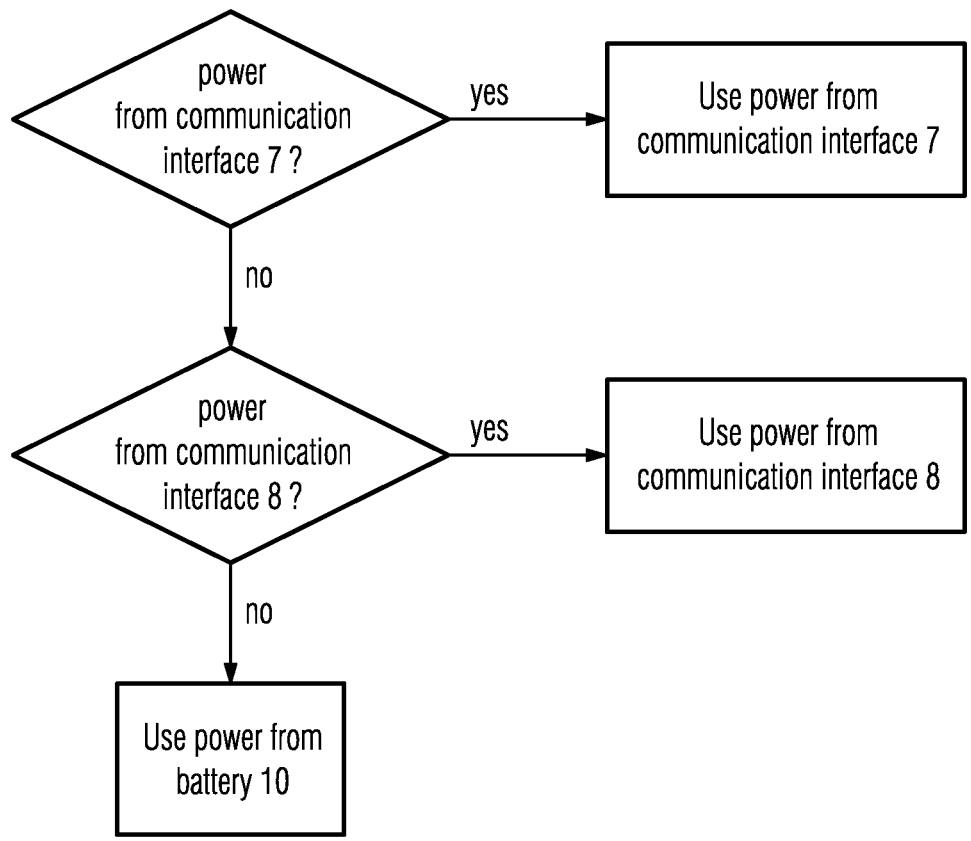
FIG. 2 is a flow chart illustrating a power strategy of the chip card.

For the exemplary embodiment, the power management unit 11 carries out, after being activated, the following power priority strategy if more than one power source is available for the chip card 1. The power strategy is summarized in FIG. 2.

If more than one power source is available, then the power management unit 11 selects the strongest power source. Should power be available via the contact communication interface 7, then the power management unit 11 always selects this power source such that the chip card 1, i.e. its microcontroller 3 and the display driver 5 are powered via the contact communication interface 7.

If no power is available via the contact communication interface 7, then the power management unit 11 checks if power for the microcontroller 3 and the display driver 5 is available via the contactless communication interface 8. If this is the case, then the power management unit 11 selects the contactless communication interface 8 to power the chip card 1.

Figure 3:
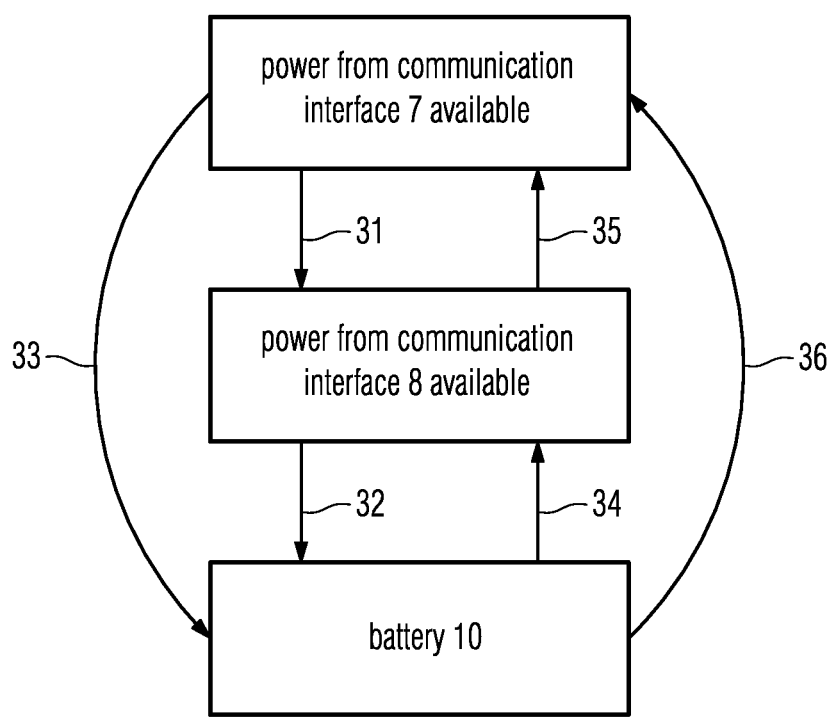
FIG. 3 is a flow chart illustrating a power takeover strategy of the chip card.

If power is neither available via the contactless communication interface 8 nor via the contact communication interface 8, then the power management unit 11 selects the battery 10 to power the chip card 1. During operation of the chip card 1 it may happen that the power source currently used is lost or that a stronger power source than currently used becomes available. For the exemplary embodiment, the power management unit 11 further implements the following power takeover strategy which is summarized in FIG. 3:

A) Assuming, the chip card 1 is initially powered via the contact communication interface 7 and power is lost via the contact communication interface 7, but power is available via the contactless communication interface 8. If information to be displayed on the display 6 has been completely received from the reader 9, then this information is displayed utilizing the display 6 and the display driver 5 is powered via the contactless interface 8, otherwise the chip card 1 is shut off. This is indicated by an arrow 31 in FIG. 3.

B) Assuming, the chip card 1 is initially powered via the contactless communication interface 8 and power is lost via the contactless communication interface 8. If information to be displayed on the display 6 has been completely received from the reader 9, then this information is displayed utilizing the display 6 and the display driver 5 is powered by the battery 10, otherwise the chip card 1 is shut off. This is indicated by an arrow 32 in FIG. 3.

C) Assuming, the chip card 1 is initially powered via the contact communication interface 7, power is lost via the contact communication interface 7, and no power is available via the contactless communication interface 8. If information to be displayed on the display 6 has been completely received from the reader 9, then this information is displayed utilizing the display 6 and the display driver 5 is powered by the battery 10, otherwise the chip card 1 is shut off. This is indicated by an arrow 33 in FIG. 3.

D) Assuming, the chip card 1 is currently powered by the battery 10. If power becomes available via the contactless communication interface 8, then the power management unit 11 selects that the chip card 1 is powered via the contactless communication interface 8. This is indicated by an arrow 34 in FIG. 3.

E) Assuming, the chip card 1 is currently powered via the contactless communication interface 8 and power becomes available via the contact communication interface 7. Then, the reader 9 will reset the microcontroller 3 via the contact communication interface 7 and the chip card 1 will be powered by the contact communication interface 7. This is indicated by an arrow 35 in FIG. 3.

F) Assuming, the chip card 1 is currently powered by the battery 10. If power becomes available via the contact communication interface 7, then the power management unit 11 selects that the chip card 1 is powered via the contact communication interface 7. This is indicated by an arrow 36 in FIG. 3.

The reader 9 will reset the microcontroller 3, but the display driver 5 will continue to operate using the contact power source. This is useful, because updating the display 6 by the display driver 5 may take a relatively long time and support by the microcontroller 3 is not needed during this time.

The chip card 1 described above comprises the two communication interfaces 7, 8. This is not absolutely necessary. The chip card 1 can also comprise only one of the communication interfaces. Furthermore, the chip card 1 does not necessarily need the battery 10. Additionally, the button 12 and the button interface 13, generally an input device with associated input interface are optional.

Finally, it should be noted that the aforementioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A chip card comprising:
a chip card controller;
a display;
a display driver operatively coupled to the chip card controller and to the display, wherein the display driver is formed as a single integrated circuit;
a user input device;
a user input interface operatively coupled to the user input device, wherein the user input interface is configured to turn on and/or turn off at least parts of the chip card and is an integral part of the display driver; and
a power management functionality configured to manage electric power that is available from at least one power source for at least the display driver, wherein the power management functionality is configured to turn off power for the chip card controller while the display driver writes information to the display.

2. The chip card of claim 1, wherein the user input device is a button, and the user input interface is a button interface operatively coupled to the button and integrated into the display driver.

3. The chip card of claim 2, wherein the button is embedded in a substrate of the chip card.

4. The chip card of claim 1, wherein the user input interface is configured to generate a signal to wake up at least parts of the chip card in response to activating the user input device and the chip card is shut off before activating the user input device.

5. The chip card of claim 1, further comprising:
access to at least one electric power source operatively coupled to the display driver, wherein the power management functionality is part of the display driver.

6. The chip card of claim 5, wherein the power management functionality is configured to also manage electric power for the chip card controller.

7. The chip card of claim 5, further comprising:
access to at least two different power sources, wherein the power management functionality is configured to select access to one of the at least two different power sources in accordance with availability of the at least two different power sources.

8. The chip card of claim 7, wherein access to the at least two different power sources is at least one of:
a contact communication interface of the chip card configured to allow communication of the chip card controller with a contact reader and
a contactless communication interface of the chip card configured to allow communication of the chip card controller with a contactless reader.

9. The chip card of claim 7, wherein the power management functionality of the display driver is configured to select, if the chip card is activated, a battery of the chip card as the power source for the chip card if no power is available via a communication interface of the chip card configured to allow communication of the chip card controller with a reader; and to switch from the battery as the power source for the chip card to the communication interface as the power source for the chip card if power becomes available via the communication interface.

10. The chip card of claim 9, wherein the battery is chargeable by a solar cell.

11. The chip card of claim 7, wherein the power management functionality of the display driver is configured to select a contact communication interface of the chip card configured to allow communication of the chip card controller with a contact reader as the preferred power source for the chip card if power becomes available via the contact communication interface.

12. The chip card of claim 7, wherein the power management functionality is configured to select a strongest power source when more than one power source is available.

13. The chip card of claim 7, wherein the chip card has access to three different power sources.

14. The chip card of claim 13, wherein the three different power sources are a battery, a contact communication interface, and a contactless communication interface.

15. The chip card of claim 5, wherein the user input interface is configured to generate a signal to wake up the power management functionality in response to activating the user input device and the chip card is shut off before activating the user input device.

16. The chip card of claim 15, wherein the user input interface and the power management functionality are formed on the same semi-conductor, the power management functionality is configured to turn off the entire chip card, and the user input device is configured to generate a signal, particularly a voltage signal, sufficient to wake up the power management functionality via the user input interface.

17. The chip card of claim 16, wherein the user input device is a push button, the user input interface is a button interface, and the push button provides, when activated, a signal of sufficient energy to wake up the power management functionality via the button interface.

18. The chip card of claim 1, wherein the display driver further comprises a voltage converter.

19. The chip card of claim 18, wherein the voltage converter is integrated into a single integrated circuit with the display driver.

* * * * *